United States Patent [19]

Sakai et al.

[11] Patent Number: 4,940,610

[45] Date of Patent: Jul. 10, 1990

[54] METHOD FOR PREVENTING LOOSENING OF A BOLT

[75] Inventors: Jun Sakai; Takeshi Natsume, both of Saitama, Japan

[73] Assignee: Honda Giken Kogyo Kabushiki Kaisha, Tokyo, Japan

[21] Appl. No.: 349,704

[22] Filed: May 10, 1989

[30] Foreign Application Priority Data

May 10, 1988 [JP] Japan .................. 63-111427

[51] Int. Cl.$^5$ .................................... B05D 3/12
[52] U.S. Cl. ........................... 427/355; 29/458; 29/525.1; 411/82; 411/258; 427/370
[58] Field of Search ............... 411/82, 258; 29/458, 29/460, 525.1, 527.2; 427/355, 370

[56] References Cited

U.S. PATENT DOCUMENTS 2,996,735  8/1961  Knacke .................. 29/458 X

Primary Examiner—Michael Lusignan
Attorney, Agent, or Firm—Lyon & Lyon

[57] ABSTRACT

A method for preventing loosening of a bolt fastened to a metallic member coated with an anticorrosive paint film without removing the paint film. Anticorrosive painting is applied on a metallic member, and then the painted film is thinned by applying an urging pressure onto a bolt seat surface portion of the painted metallic member by means of a press rod. The bolt seat surface portion of the metallic member also may be flattened by applying an urging pressure on the bolt seat surface portion by means of a press rod or by machining the bolt seat surface portion before the anticorrosive painting is applied on the metallic member, and then the painted film is thinned by applying an urging pressure onto the above-mentioned bolt seat surface portion by means of a press rod.

7 Claims, 7 Drawing Sheets

FIG. 8d SAMPLE d (TOUCH UP) ←20μm

FIG. 8c SAMPLE c (HOT PRESS) ←15μm

FIG. 8b SAMPLE b (DIP PAINTING) ←84μm

FIG. 8a SAMPLE a (PRIMER) ←23μm

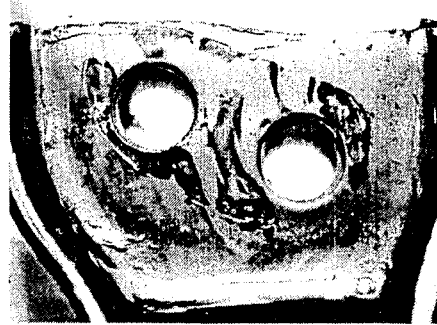
FIG. 9a (PRIMER)
FIG. 9b (DIP PAINTING)
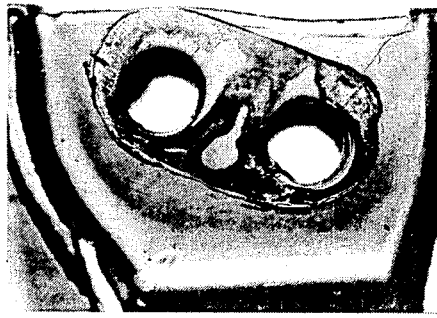
FIG. 9c (HOT PRESS)
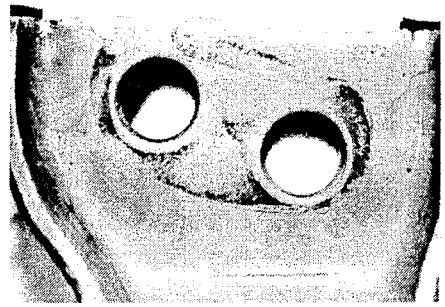
FIG. 9d (TOUCH UP)

METHOD FOR PREVENTING LOOSENING OF A BOLT

BACKGROUND OF THE INVENTION

1. Field of the Invention

The present invention relates to a method for preventing loosening of a bolt fastened to a metallic member coated with a thick anticorrosive paint film.

2. Description of the Prior Art

As a support member (commonly called "bracket") for fixedly securing an engine to a vehicle body of a motorcar, a member made of cold-rolled sheet steel, hot-rolled sheet steel or cast iron has been used. In general, such support members are subjected to anti-corrosion treatment, and members made of pressed sheet steel are subjected to plating treatment or electrodeposition painting, while members made of cast iron are subjected to dip coating.

The reason why members made of cast iron are subjected to dip painting is because their cast surfaces are not flat, and because the coated film is thick (a minimum film thickness being 30~60 $\mu$m), after a bolt has been fastened the coated film positioned at the bolt seat surface portion would be subject to plastic deformation into a thin film as time elapses, and loosening of the bolt would occur. Therefore, in the prior art, in order to prevent such loosening of a bolt, a countermeasure was taken through the method of (1) performing masking of the bolt seat surface portion for dip painting, (2) forming a bolt seat surface portion by machining the painted member, or the like. However, if the base skin of the bolt seat surface portion is exposed through such methods, there occurs a disadvantage that rusting of the exposed surface will readily occur and the appearance is deteriorated. In addition, if a support member made of pressed sheet steel should be subject to dip painting and then a bolt seat surface portion should be formed thereon through the above-described procedure for the reason that the process of dip painting is more economical than a treatment process such as plating, electrodeposition painting or the like, rusting will occur on the exposed base skin of the bolt seat surface portion, resulting in lowering of the mechanical strength of the relatively thin pressed sheet steel. Accordingly, in the prior art, a support member made of pressed sheet steel could not be subjected to dip painting but it had to rely upon the economically disadvantageous plating method or electrodeposition painting method. The present invention has been developed as a result of the above-mentioned technical background.

SUMMARY OF THE INVENTION

It is therefore one object of the present invention to provide an improved method for preventing loosening of a bolt fastened to a metallic member coated with an anticorrosive paint film without necessitating removal of the paint film.

According to one feature of the present invention, there is provided a method for preventing loosening of a bolt fastened to a metallic member coated with an anticorrosive paint film, including the step of thinning the anticorrosive paint film at the location of a seat of the bolt by applying an urging pressure on the bolt seat surface portion of the metallic member by means of a press rod.

According to another feature of the present invention there is provided a method for preventing loosening of a bolt fastened to a metallic member, including the steps of flattening a bolt seat surface portion of the metallic member by applying an urging pressure onto the bolt seat surface portion by means of a press rod or by machining the bolt seat surface portion, applying anticorrosive painting onto the metallic member, and then thinning a painted film by applying an urging pressure onto the bolt seat surface portion by means of a press rod.

In order to thin (compress) a thick painted film positioned at the bolt seat surface portion of the metallic member, it is only necessary to urge a press rod having a corresponding tip end area against the painted film to pressurize and compress the film. Though a high pressure is necessitated in the case of conducting this compressing or pressurizing treatment at an ordinary temperature, in the case of carrying out the treatment with the press rod kept heated, the treatment is possible at a relatively low pressure. Hence, in the case where a paint film applied to a metallic member in which cracks or undesirable deformations are liable to occur when a high pressure is applied thereto, for instance, a rolled steel sheet, a member having a bolt hole already formed, or the like, is to be thinned, it is effective to carry out low-pressure pressurizing with the press rod heated. On the other hand, in the case where a paint film applied to a metallic member whose surface is not flat and in which cracks are unlikely to occur even if a high pressure is applied thereto, for instance, a member having a bolt hole not yet formed or the like, is to be thinned, if pressurizing is conducted at an ordinary temperature and at a high pressure, there is a beneficial result that flattening of the surface of the metallic member (a bolt seat surface portion) is also effected simultaneously. In the latter case, if the flattening of the bolt seat surface portion is carried out before painting through pressurizing by means of a press rod or through machining, then thinning of the later applied paint film can be conducted by low-pressure pressurizing by means of a heated press rod.

In either the case where a press rod is heated or the case where a press rod is not heated, by properly selecting the pressing pressure a dip painted film of, for example, 30~60 $\mu$m in thickness can be thinned to a film thickness of 4~10 $\mu$m that is thinner than a paint film of 15~25 $\mu$m formed through an electrodeposition painting process. It is to be noted that in the case of using a press rod as heated, it is desirable to paint the pressurizing surface at the tip end of the press rod with a material such as fluorine resin, $MoS_2$, graphite or the like, and this can prevent the painted film from adhering to the press rod.

In addition, especially in the case of a member made of cast iron having a rough base skin, it is desirable to apply a shot-blast treatment to achieve flattening of a bolt seat surface portion prior to the dip painting treatment, whereby the film thickness of the dip-painted film at the bolt seat surface portion can be made uniform, and the thinning by pressurizing of the painted film can be carried out uniformly over the entire bolt seat surface portion.

The above-mentioned and other objects, features and advantages of the present invention will become more apparent by reference to the following description of preferred embodiments of the invention taken in conjunction with the accompanying drawings.

BRIEF DESCRIPTION OF THE DRAWINGS

In the accompanying drawings

FIGS. 8a to 8d show surface roughness of bolt seat surface portions of the engine mounting brackets; and FIGS. 9a to 9d are photographs showing states of the bolt seat surface portions after completion of the vibration tests.

DESCRIPTION OF THE PREFERRED EMBODIMENT

TEST EXAMPLE 1

Figure 1:
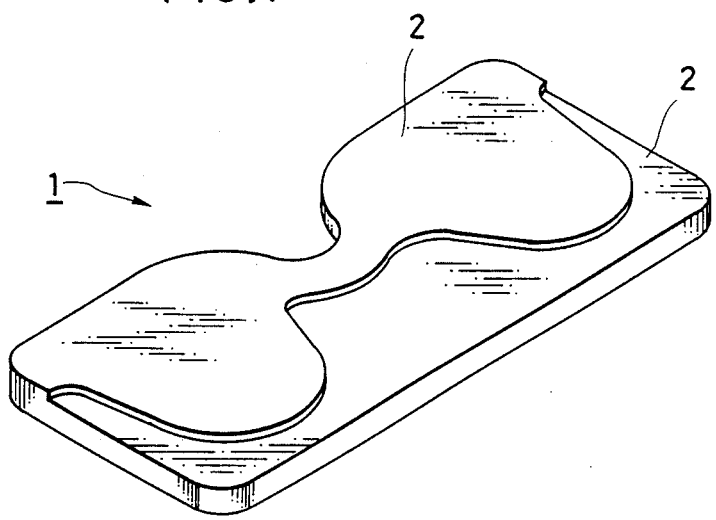
FIG. 1 is a perspective view of a sheet material made of cast iron to which the present invention is applied.

(1) A shot-blast treatment was applied to a fresh cast surface 2 of a sheet material (80×35×4 mm) cut out of a cast iron article (JIS FCD40) in a fresh cast state to get a surface roughness of 100~150 μm (FIG. 1).

Figure 2:
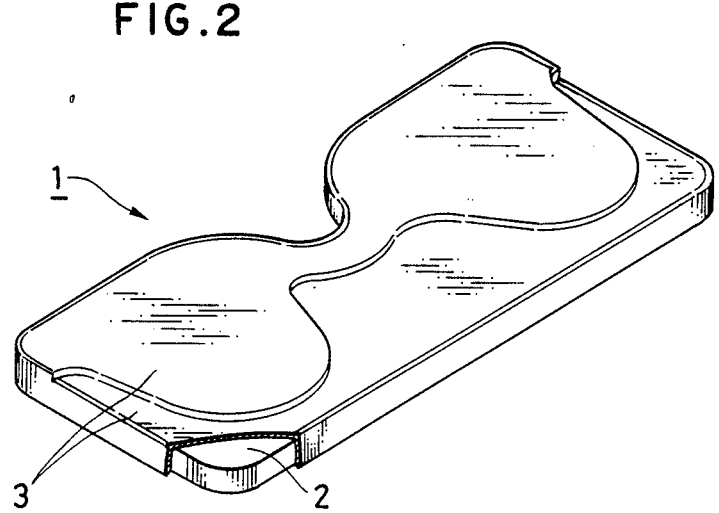
FIG. 2 is a perspective view showing the state where the sheet material shown in FIG. 1 has been painted on its fresh cast surfaces.
Figure 3:
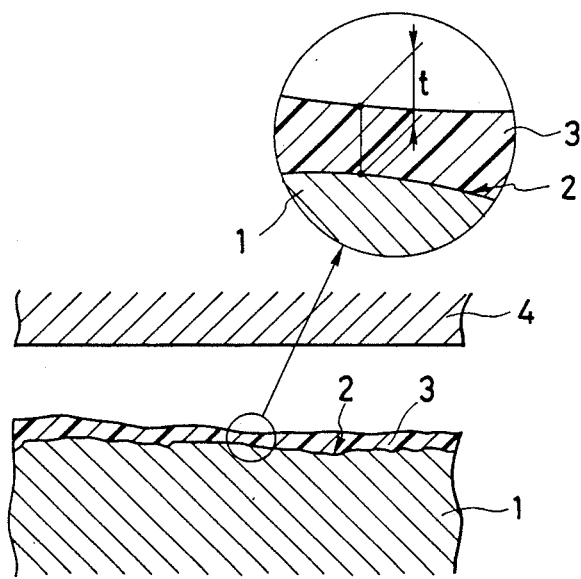
FIG. 3 is an enlarged partial cross-section view showing an essential part of the sheet material shown in FIG. 2.

(2) After the shot-blast treated surface had been subjected to a zinc phosphate coating treatment, epoxy-group low-temperature drying paint (trade name Epico MX-11 manufactured by Nihon Yushi K.K. with a baking temperature: 100° C.~120° C., baking time: 15 minutes) was applied through a 2-coat 2-bake process (painting and drying are respectively repeated twice). As shown in FIGS. 2 and 3, the painted film 3 has a minimum film thickness (t)=30~60 μm.

(3) A press rod 4 having a flat tip end was urged against the surface of the painted film 3 under the following condition:

urging pressure ... 70~130 kgf/mm$^2$ pressing time .... 0.5 seconds temperature ..... ordinary temperature It is to be noted that the procedure for forming a hole for a bolt is preferably carried out after the above-mentioned pressing operation.

Figure 4:
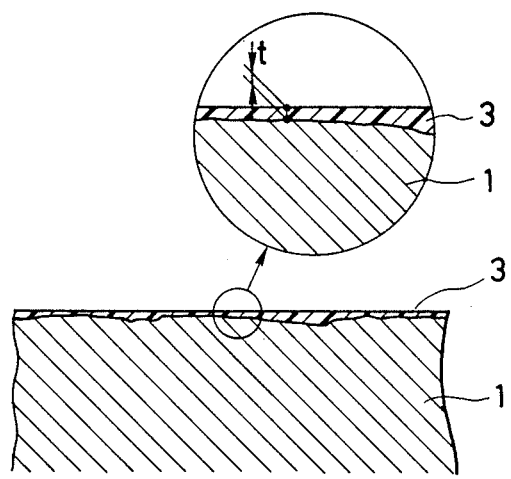
FIG. 4 is an enlarged partial cross-section view similar to FIG. 3 but showing the state wherein a painted film on the sheet material has been subjected to a pressurizing and thinning treatment.

TEST RESULTS AND THEIR EVALUATION (a) When the urging pressure was 70 kgf/mm$^2$ or more, a surface roughness became 60 μm or less, and thus it was confirmed that a flattening effect for a bolt seat surface portion could be attained (FIG. 3 shows a cross-section view before pressurizing and FIG. 4 shows a cross-section view after pressurizing).

(b) When the urging pressure exceeded 130 kgf/mm$^2$ cracks were generated in the test sample.

(c) When the urging pressure was 70-18 130 kgf/mm$^2$, a minimum film thickness (t) of the painted film 3 after pressurizing was 4~10 μm.

(d) Taking into consideration the fact that a decrement of the thickness of the above-mentioned painted film (the painted film kept intact after dip painting) when a bolt was fastened with a torque of 3.5 kg·m was 0~5 μm, it can be seen that the film thinning effect brought about by the above-described pressurizing treatment is large and thinning of the painted film by fastening a bolt will be minimal.

TEST EXAMPLE 2

(1) A bolt seat surface portion (a surface roughness of 60 μm or less) was established by coining (urging by means of a press rod) on a fresh cast surface 2 of a plurality of sheet materials I similar to that employed in Test Example 1. A similar surface condition could be established by machining.

(2) After the fresh cast surface 2 had been subjected to zinc phosphate coating treatment, epoxy-group low-temperature drying paint (trade name Epico MX-11 manufactured by Nihon Yushi K.K. with a baking temperature: 100° C.~120° C., baking time: 15 minutes) was applied through a 2-coat 2-bake process (painting and drying are respectively repeated twice) resulting in a minimum film thickness at the bolt seat surface portion of 40~60 μm.

(3) A heater was mounted within a press rod having a flat tip end, although it could be mounted outside of the press rod, and the temperature of the press rod was made controllable in the range of 50° C.~160° C. This press rod was urged against the painted film on the bolt seat surface portion under the following condition:

urging pressure 2~30 kgf/mm$^2$ pressing time 1~30 seconds temperature 50°~150° C.

Test Results and Their Evaluation (a) Under the pressing conditions enumerated in the following table, minimum film thicknesses of the thinned painted films were all 4~10 μm.

| Press Rod Temperature (°C.) | Urging Pressure (kgf/mm$^2$) | Pressing time (seconds) |
|---|---|---|
| 50 | 30 | 10 |
| 100 | 22 | 10 |
| 150 | 6 | 30 |

It is seen that the pressurizing treatment effect with an urging pressure of 70~130 kgf/mm$^2$ at an ordinary temperature and the pressurizing treatment effect with an urging pressure of 6~30 kgf/mm$^2$ at a temperature of 50°~150° C. are equivalent to each other, and that if the pressurizing treatment temperature is raised, the urging pressure can be lowered.

TEST EXAMPLE 3

Figure 5:
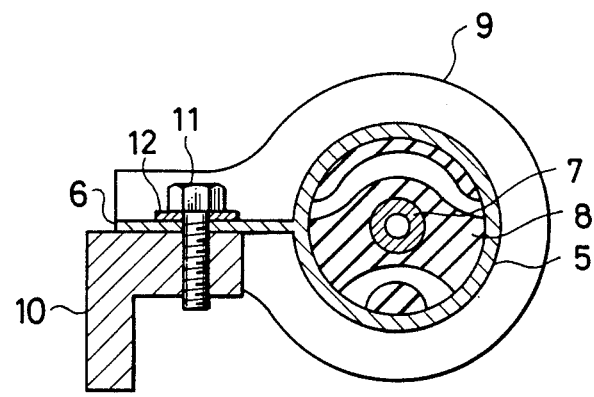
FIG. 5 is a cross-section view showing an engine mounting bracket attached to a supporting member by bolts for testing.

(1) Four samples of engine mounting bracket S made of steel plate, which has a bolt seat portion 6, an inner tube 7 for mounting an engine supported through the intermediary of a rubber piece 8 and reinforcing flange portions 9 at the both sides as shown in FIG. 5, were prepared.

The sample a was subjected to only pre-treatment with a primer.

The sample b was subjected to the pre-treatment and dip painting.

The sample c was subjected to the pre-treatment, the dip painting and thinning of the painted film at the bolt seat surface portion by a hot press rod.

The sample d was subject to the pre-treatment, masking of the bolt seat surface portion upon dip painting and touch-up of the surface portion by applying slight painting onto the exposed surface portion.

Conditions of the thinning by the hot press rod in the sample c were as follows:

Press rod temperature ... 145° C.

Pressing time ....... 5 sec

Urging pressure ...... 1000 Kgf/cm²

The paint used on the dip painting was trade name Water Coat No. 709 manufactured by Cashue Co.

FIGS. 8a to 8d show the surface roughness of the obtained bolt seat surface portions of the samples a to d, respectively, and the numbers indicate the largest measured roughness for that surface.

Hardness by JIS Pencil Hardness Testing Method of the films on the obtained bolt seat surfaces were as follows:

Sample b ... ... ... HB

Sample c ... ... ... H

Sample d ... ... ... F

The above testing method determines the hardness by scratching the surface with pencils having leads of various hardness. The hardness becomes higher in order of ...2B, B, HB, F, H, 2H..., that is, 2B side is softer and 2H side is harder.

Figure 6:
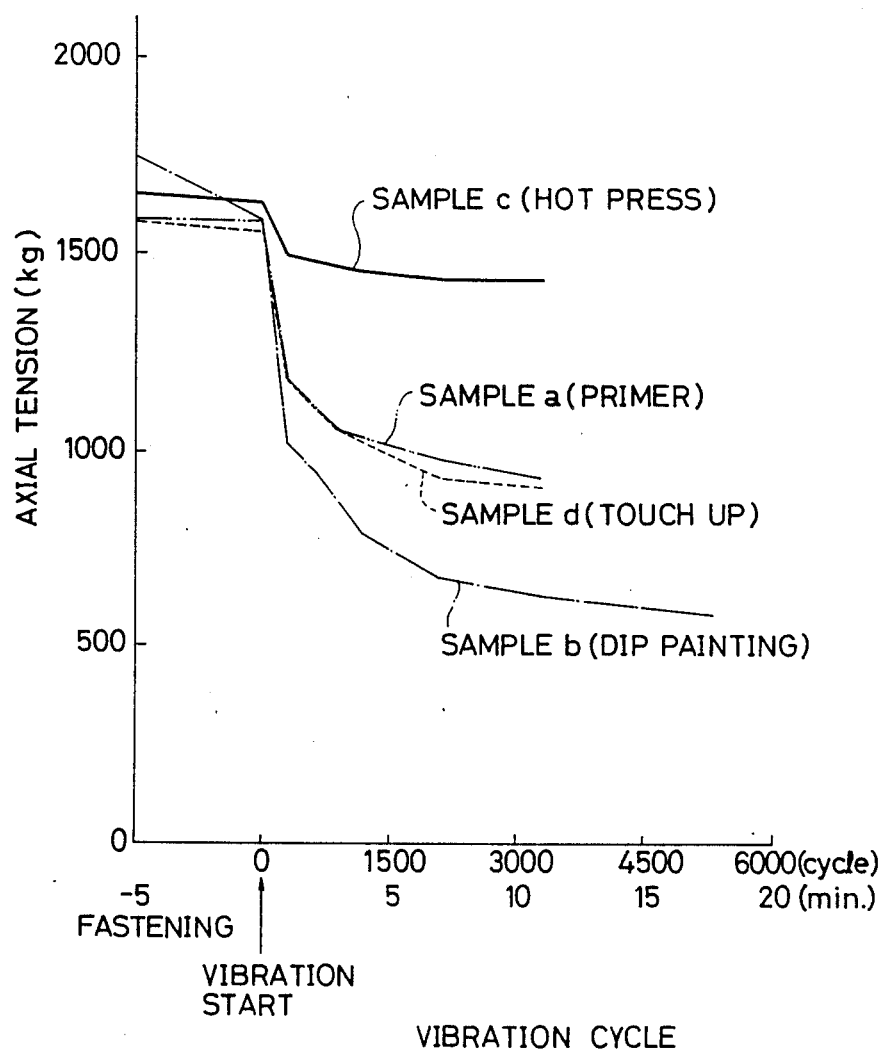
FIG. 6 is a graph showing results of vibration tests carried out on various kinds of the engine mounting brackets as shown in FIG. 5.

(2) Each bracket 5 (sample a to d) was fastened to a supporting member 10 by two bolts 11 through a washer 12 as shown in FIG. 5. Five minutes after fastening, the bracket was given a vibration of 5 Hz by repeated load of about 500 Kg applied on the inner tube 7, and reduction of the axial tension of the bolt are measured. The results are shown in FIG. 6 in which the abscissa indicates number of cycle or elapsed time in minutes and the ordinate indicates the axial tension of the bolt 11. FIGS. 9a to 9d are photographs showing states of the bolt seat surface portion after completion of the vibration tests.

TEST EXAMPLE 4

Figure 7:
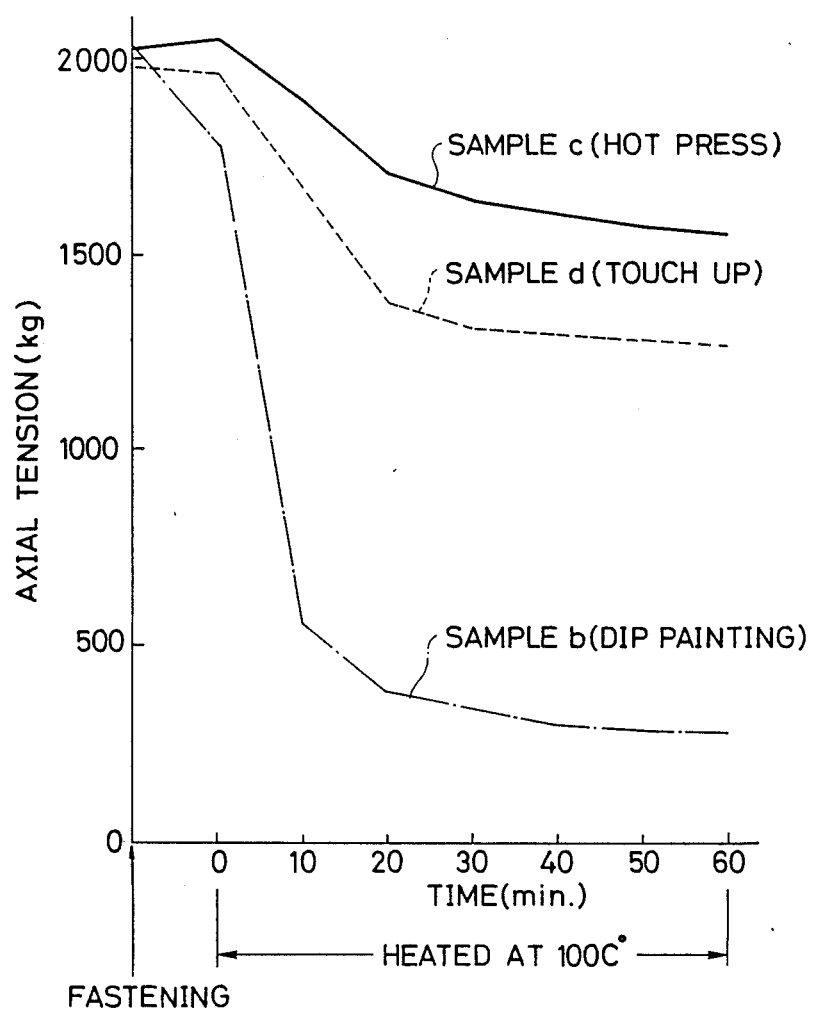
FIG. 7 is a graph showing results of heating tests carried out on various kinds of the engine mounting brackets as shown in FIG. 5.

Three samples of engine mounting bracket 5 similar to the above-mentioned samples b, c and d were prepared and each sample was assembled with the supporting member 10 as shown in FIG. 5. The assemblies were heated within an isothermal box at 100° C. to measure reduction of the axial tensions of the bolts due to softening of the paints. The results are shown in FIG. 7 in which the abscissa indicates heating time in minutes and the ordinate indicates axial tension of the bolt.

As will be apparent from the above description, according to the method proposed by the present invention in which a painted film is thinned by applying an urging pressure onto a bolt seat surface portion by means of a press rod, the following effects and advantages can be obtained:

(1) Since the painted film at a bolt seat surface portion is thinned and condensed by pressurizing, loosening of the bolt after fastening of the bolt caused by compressed deformation of the painted film or softening of the painted film due to high temperature is reduced.

(2) As there is no need to remove the painted film at a bolt seat surface portion, rusting at the bolt fastening portion is avoided, and so, deterioration of appearance caused by rusting can be prevented.

(3) In the case where the metallic member is a member made of cast iron for supporting an engine made of aluminum alloy, in contrast to flattening of a bolt seat surface portion by machining as is the case with the prior art wherein corrosion of the engine made of aluminum alloy will occur due to the sacrifice anode effect, according to the present invention since the bolt seat surface portion is covered by the painted film, such corrosion will not occur.

(4) In the case where the metallic member is a member made of cast iron, since the rough surface of the cast iron member is somewhat flattened and a bolt seat surface portion can be established when a thick painted film at the bolt seat surface portion is thinned by pressurizing, there is no need to flatten the bolt seat surface portion by machining as is the case with the prior art, and so, reduction of the manufacturing cost can be achieved.

(5) In the case where the metallic member is a member made of cast iron, it is desirable to establish a flat and smooth bolt seat surface portion prior to execution of anticorrosive painting, whereby a film thickness of the painted film applied to the bolt seat surface portion can be made uniform, and pressurized thinning of the painted film can be effected uniformly.

(6) In the prior art, when thick painting for a member made of cast iron having a bolt hole is effected, a procedure of masking the bolt seat surface portion to prevent deposition of a painted film and thereafter applying slight anticorrosive painting onto the exposed base skin of the bolt seat surface portion was employed, but as compared to this procedure in the prior art, the method according to the present invention is economical and provides a cheap manufacturing cost. The same is also true even if the present invention is compared to the case where after thick painting, establishment of a bolt seat surface portion is effected by machining, and slight anticorrosive painting is applied to the same surface portion.

While the principle of the present invention has been described above in connection with preferred embodiments of the invention, it is intended that all matter contained in the description and illustrated in the accompanying drawing shall be interpreted to be illustrative and not in a limiting sense.

What is claimed is:

1. A method for preventing loosening of a bolt fastened to a metallic member coated with an anticorrosive paint film, characterized by the step of thinning said anticorrosive paint film by applying an urging pressure on a bolt seat surface portion of said coated metallic member by means of a press rod.

2. A method for preventing loosening of a bolt as claimed in claim 1, wherein said metallic member is a member made of cast iron that is kept intact after casting, and at least the bolt seat surface portion thereof is subjected to shot-blast treatment.

3. A method for preventing loosening of a bolt as claimed in claim 1, wherein said press rod to be used for thinning the painted film is heated.

4. A method for preventing loosening of a bolt as claimed in claim 3, wherein a material selected from the group consisting of fluorine resin, $MoS_2$ and graphite, is deposited on a pressing surface of the press rod to be used for thinning of said painted film.

5. A method for preventing loosening of a bolt fastened to a metallic member, characterized by the steps of flattening a bolt seat surface portion of said metallic member by applying an urging pressure onto the bolt seat surface portion by means of a press rod or by machining the bolt seat surface portion, applying anticorrosive paint in a film on said metallic member, and then thinning the painted film by applying an urging pressure on the bolt seat surface portion by means of a press rod.

6. A method for preventing loosening of a bolt as claimed in claim 5, wherein said press rod to be used for thinning the painted film is heated.

7. A method for preventing loosening of a bolt as claimed in claim 6, wherein a material selected from the group consisting of fluorine resin, $MoS_2$ and graphite, is deposited on a pressing surface of the press rod to be used for thinning of said painted film.

* * * * *